(12) United States Patent
Saitou

(10) Patent No.: US 8,801,888 B2
(45) Date of Patent: Aug. 12, 2014

(54) PROCESS FOR PRODUCING DECORATIVE SHEET, DECORATIVE SHEET, AND DECORATIVE MOLDED ARTICLE OBTAINED USING SAME

(75) Inventor: Nobuo Saitou, Saitama (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 13/807,081

(22) PCT Filed: Jun. 30, 2011

(86) PCT No.: PCT/JP2011/065084
§ 371 (c)(1),
(2), (4) Date: Dec. 27, 2012

(87) PCT Pub. No.: WO2012/002504
PCT Pub. Date: Jan. 5, 2012

(65) Prior Publication Data
US 2013/0101793 A1     Apr. 25, 2013

(30) Foreign Application Priority Data
Jun. 30, 2010   (JP) ................................ 2010-150581

(51) Int. Cl.
| | |
|---|---|
| B29C 65/72 | (2006.01) |
| B32B 37/16 | (2006.01) |
| B32B 38/06 | (2006.01) |
| B32B 38/14 | (2006.01) |
| B44C 1/165 | (2006.01) |
| B29C 65/02 | (2006.01) |
| B44C 1/17 | (2006.01) |

(52) U.S. Cl.
USPC .......... 156/240; 156/153; 156/249; 156/272.2

(58) Field of Classification Search
USPC ............... 156/153, 209, 240, 249, 272.2, 289
See application file for complete search history.

(56) References Cited

U.S. PATENT DOCUMENTS

2010/0062218 A1    3/2010    Atake et al.

FOREIGN PATENT DOCUMENTS

| CN | 101631674 A | 1/2010 |
|---|---|---|
| EP | 2133201 A1 * | 12/2009 |

(Continued)

OTHER PUBLICATIONS

English translation of JP2006-123536; May 18, 2006.*

(Continued)

*Primary Examiner* — Sonya Mazumdar
(74) *Attorney, Agent, or Firm* — Antonelli, Terry, Stout & Kraus, LLP.

(57) ABSTRACT

The present invention relates to a production process for a decorative sheet comprising a step in which a primer layer is formed on a releasing film having a smooth surface, a step in which a design layer is formed on the above primer layer, a step in which the primer layer and the design layer are transferred on a base material, a step in which the releasing film on the base material is peeled off, a step in which an ionizing radiation curable resin composition is laminated on the primer layer formed on the base material and a step in which the above ionizing radiation curable resin composition is cross-linked and cured to form a surface protective layer.

Capable of being provided is a decorative sheet of a high gloss which keeps a surface smoothness and a gloss and maintains a design feeling even after three-dimensional molding such as insert molding, injection molding simultaneous decoration and the like and which is less liable to generate dents and wounds on a surface by wrapping therein foreign matters even when winding the decorative sheet on a roll and less liable to produce scratches and wrinkles by bringing a surface and a rear face of the decorative sheet into close contact with each other.

6 Claims, 2 Drawing Sheets

(56) References Cited

FOREIGN PATENT DOCUMENTS

| | | |
|---|---|---|
| JP | 2000-071410 | 3/2000 |
| JP | 2000-512225 A | 9/2000 |
| JP | 2005-313600 A | 11/2005 |
| JP | 2006-123536 A | 5/2006 |
| JP | 2007-268740 A | 10/2007 |
| WO | WO 9746377 A1 * | 12/1997 |

OTHER PUBLICATIONS

English translation of JP2007-68740; Oct. 18, 2007.*
English translation of JP2000-071410; Mar. 7, 2000.*
English translation of JP2005-313600;Nov. 10, 2005.*
CN Office Action dated Dec. 12, 2013, CN201180032774.7.

* cited by examiner

PROCESS FOR PRODUCING DECORATIVE SHEET, DECORATIVE SHEET, AND DECORATIVE MOLDED ARTICLE OBTAINED USING SAME

BACKGROUND OF THE INVENTION

The present invention relates to a production process for a decorative sheet used for decorative molded articles of various applications such as buildings, vehicles, fittings and the like, a decorative sheet and a decorative molded article prepared by using the same.

RELATED ART

Decorative molded articles decorated by laminating decorative sheets on the surfaces of molded articles are used for various applications such as members for buildings, vehicle interior parts and the like. A decorative sheet used for the above decorative molded articles is produced usually by laminating a design layer and a surface protective layer in order on a base material.

In the above production process, however, irregularities are produced on a surface thereof when a design layer is formed, and when a surface protective layer is laminated thereon, a smoothness of the surface protective layer is likely to be damaged.

On the other hand, proposed in a patent document 1 are skin materials for automobile interior containing a thermoplastic resin base coat/transparent coating film which is stuck on an outside surface of a thermoplastically moldable semi-rigid resin backing sheet. It is described therein that the base coat and the transparent coating film described above are coated on a matting career and dried and that they are then transferred on the backing sheet described above and laminated thereon. In the patent document 1, however, a gloss of the transparent coat depends on a smoothness of the matting career, and therefore the problem that it is difficult to finely control the smoothness is brought about.

Further, if a decorative sheet is not at all subjected to smoothing treatment as used to be in the past, a smoothness and a gloss of the decorative sheet are notably different from a smoothness and a gloss of the decorative molded article after injection molding, and therefore a design feeling of the decorative sheet is different from a design feeling of the decorative molded article to a large extent.

Patent document 1: Japanese Patent Application Laid-Open (through PCT) No. 512225/2000

DISCLOSURE OF THE INVENTION

In order to solve the problems described above, it is considered that a metal plate subjected to mirror treatment after laminating a surface protective layer is used to be subjected to smoothing treatment by hot press processing and the like as a method for providing a surface of a surface protective layer with a smoothness and a gloss. However, even if a surface of a surface protective layer is smoothed, irregularities of a design layer remain, and therefore when a decorative sheet is heated in insert molding and injection molding simultaneous decoration to allow the surface protective layer to be softened, the irregularities of the design layer come up to the surface protective layer, so that a smoothness and a gloss on a surface of the decorative molded article are likely to be damaged. That is, a high smoothness and a high gloss of the decorative sheet are reduced after injection molding and different from a smoothness and a gloss of the decorative molded article after injection molding, and a design feeling of the decorative sheet is likely to be different from a design feeling of the decorative molded article.

In light of the problems described above, the present inventors have filed a patent (Japanese Patent Application No. 088099/2009) related to a production process for a decorative sheet of a high gloss which keeps a surface smoothness and a gloss and maintains a design feeling even after three-dimensional molding such as insert molding, injection molding simultaneous decoration and the like. However, they have found that involved therein are the problems that when both surfaces of a decorative sheet are smoothed by a step in which the surfaces of a design layer and a primer layer are smoothed, small dusts and rubbishes are wrapped in a roll of the decorative sheet produced to generate dents and wounds and that a surface and a back face of the decorative sheet are tightly adhered with each other to generate scratches and wrinkles.

In light of the problems described above, an object of the present invention is to provide a production process for a decorative sheet of a high gloss which keeps a surface smoothness and a gloss and maintains a design feeling even after three-dimensional molding such as insert molding, injection molding simultaneous decoration and the like and which is less liable to generate dents and wounds by wrapping therein foreign matters even when winding the decorative sheet on a roll and less liable to produce scratches and wrinkles by bringing a surface and a rear face of the decorative sheet into close contact with each other.

Intensive researches repeated by the present inventors in order to solve the problems described above have resulted in finding that the problems described above can be solved by carrying out smoothing treatment before laminating a surface protective layer and subjecting a rear face to roughening treatment. In particular, they have found that the problems described above can be solved by carrying out the roughening treatment so that a ten point average roughness RzJIS of the rear face and a thickness of the base material and an arithmetic average roughness Ra of the rear face and a thickness of the base material satisfy specific equations respectively. The present invention has been completed based the above knowledge.

That is, the present invention provides the following items:

[1] a production process for a decorative sheet comprising a step in which a primer layer is formed on a releasing film having a smooth surface, a step in which a design layer is formed on the above primer layer, a step in which the primer layer and the design layer are transferred on a base material, a step in which the releasing film on the base material is peeled off, a step in which an ionizing radiation curable resin composition is laminated on the primer layer formed on the base material and a step in which the above ionizing radiation curable resin composition is cross-linked and cured to form a surface protective layer, wherein it further comprises a roughening treatment step in which a ten point average roughness RzJIS on a rear face of the decorative sheet and a thickness T of the base material are controlled to satisfy the following equation (I) and in which an arithmetic average roughness Ra on the rear face and a thickness T of the base material are controlled to satisfy the following equation (II):

$$T \times 0.30 \geq Rz\text{JIS} \quad (I)$$

$$T \times 0.20 \geq Ra \geq T \times 0.005 \quad (II)$$

[2] a production process for a decorative sheet comprising a step in which a primer layer is formed on a releasing film having a smooth surface, a step in which a design layer is formed on the above primer layer, a step in which the primer layer and the design layer are transferred on a base material, a step in which the releasing film on the base material is peeled off, a step in which an ionizing radiation curable resin composition is laminated on the primer layer formed on the base material and a step in which the above ionizing radiation curable resin composition is cross-linked and cured to form a surface protective layer, wherein it further comprises a roughening treatment step in which an arithmetic average roughness Ra on a rear face of the decorative sheet is controlled to 1.0 to 10.0 μm,

[3] a decorative sheet comprising a design layer, a primer layer and a surface protective layer formed by cross-linking and curing an ionizing radiation curable resin composition in this order on a base material, wherein a surface of the surface protective layer is smooth; a ten point average roughness RzJIS on a rear face of the decorative sheet and a thickness T of the base material satisfies the following equation (I); and an arithmetic average roughness Ra on the rear face and a thickness T of the base material satisfies the following equation (II):

$$T \times 0.30 \geq RzJIS \quad (I)$$

$$T \times 0.20 \geq Ra \geq T \times 0.005 \quad (II)$$

[4] a decorative sheet comprising a design layer, a primer layer and a surface protective layer formed by cross-linking and curing an ionizing radiation curable resin composition in this order on a base material, wherein a surface of the surface protective layer is smooth, and an arithmetic average roughness Ra on a rear face of the decorative sheet is 1.0 to 10.0 μm.

According to the production process of the present invention for a decorative sheet, there has been obtained a decorative sheet of a high gloss which keeps a surface smoothness and a gloss and maintains a design feeling even after three-dimensional molding such as insert molding, injection molding simultaneous decoration and the like and which is less liable to generate dents and wounds by wrapping therein foreign matters even when winding the decorative sheet on a roll and less liable to produce scratches and wrinkles by allowing a surface and a rear face of the decorative sheet to be tightly adhered with each other. When the above decorative sheet was actually produced, wounds and dents generated by wrapping therein foreign matters were inhibited, and blocking between a surface and a rear face of the decorative sheet was restrained.

| EXPLANATION OF THE CODES | |
|---|---|
| 10 | Decorative sheet |
| 11 | Releasing film |
| 12 | Primer layer |
| 13 | Design layer |
| 14 | Base material |
| 15 | Surface protective layer |
| 16 | Fine particle-containing resin layer |

BEST MODE FOR CARRYING OUT THE INVENTION

The production process of the present invention for a decorative sheet is characterized by comprising a step in which a primer layer is formed on a releasing film having a smooth surface, a step in which a design layer is formed on the above primer layer, a step in which the primer layer and the design layer are transferred on a base material, a step in which the releasing film on the base material is peeled off, a step in which an ionizing radiation curable resin composition is laminated on the primer layer formed on the base material, a step in which the above ionizing radiation curable resin composition is cross-linked and cured to form a surface protective layer and a roughening treatment step in which a ten point average roughness RzJIS on a rear face of the decorative sheet and a thickness T of the base material are controlled to satisfy the equation (I) described above and in which an arithmetic average roughness Ra on the rear face and a thickness T of the base material are controlled to satisfy the equation (II) described above or a roughening treatment step in which an arithmetic average roughness Ra on a rear face of the decorative sheet is controlled to 1.0 to 10.0 μm. The production process of the present invention shall be explained below in detail by using FIG. 1 and FIG. 2.

Figure 1:
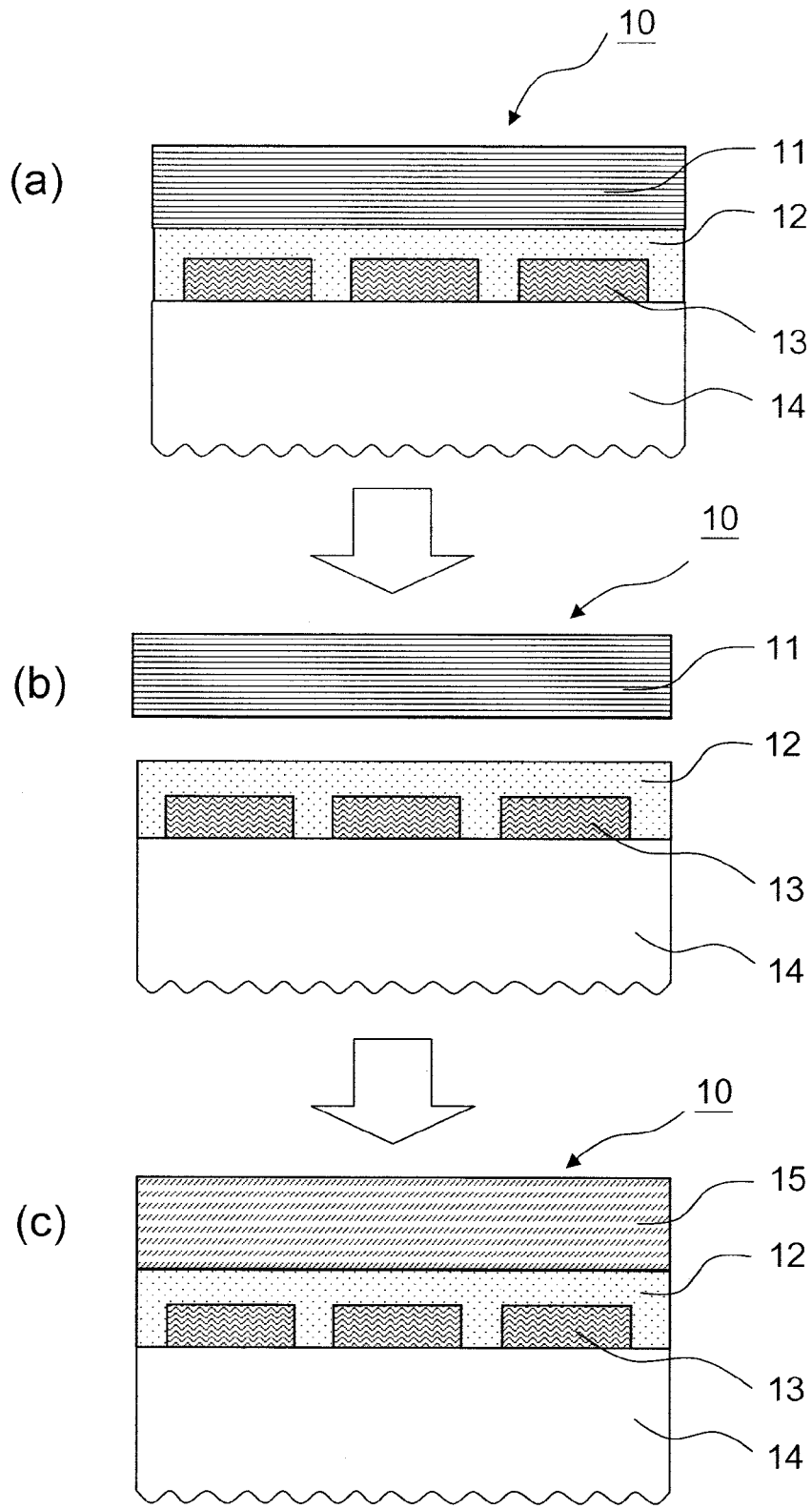
FIG. 1 is a step drawing showing one embodiment of the invention in the production process of the present invention for a decorative sheet.
Figure 2:
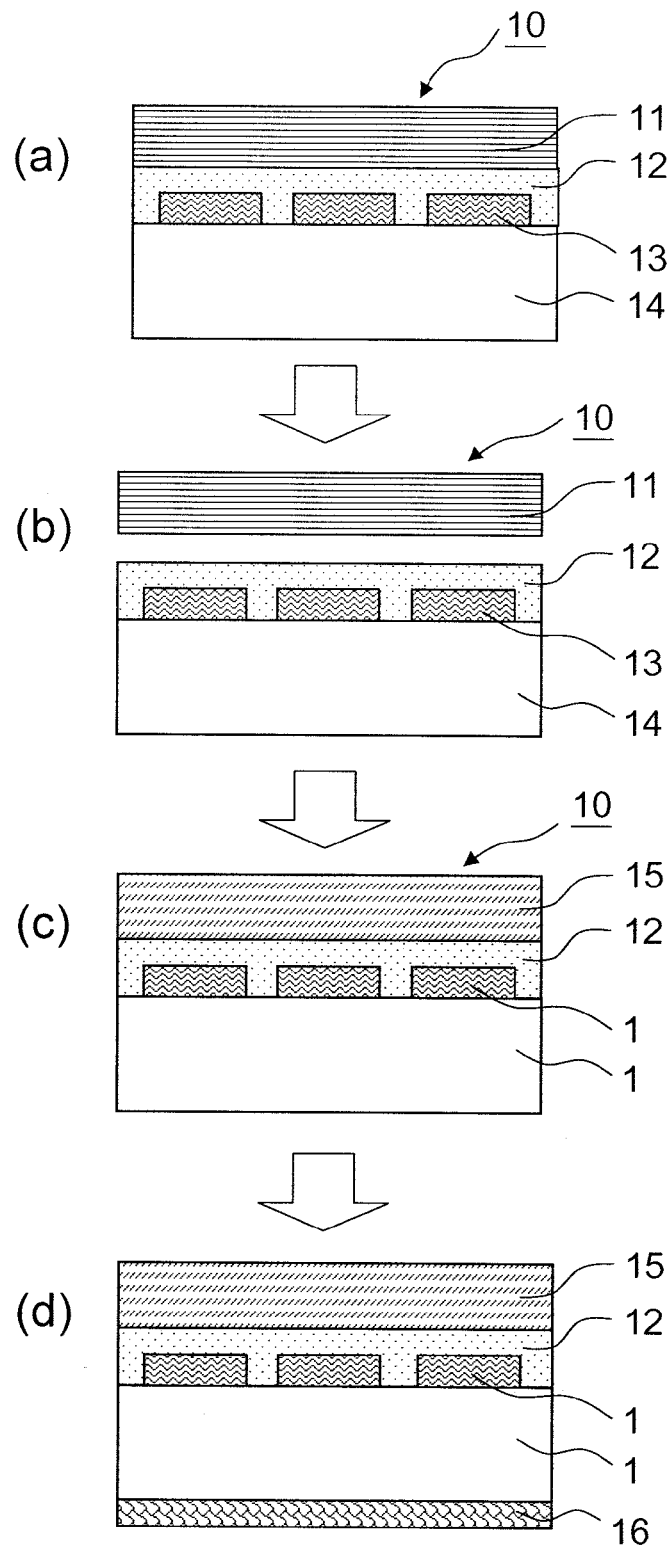
FIG. 2 is a step drawing showing one embodiment of the invention in the production process of the present invention for a decorative sheet.

FIG. 1 and FIG. 2 are step drawings showing the outline of the production process of the present invention for a decorative sheet. The production process of the present invention comprises at least the following steps (1) to (7).

(1) Step in which a primer layer is formed on a releasing film:

A primer composition is laminated on a releasing film 11 having a smooth surface and then dried, if necessary, whereby a primer layer 12 is formed.

In the present invention, a smooth surface of the releasing film means that it has an arithmetic average roughness (Ra) of 0.5 μm or less, preferably 0.2 μm or less. In this regard, the arithmetic average roughness (Ra) means an arithmetic average roughness Ra prescribed in JIS B 0601: 2001.

Also, a smoothness of the decorative sheet of the present invention is preferably 0.5 μm or less, more preferably 0.2 μm or less in terms of an arithmetic average roughness Ra.

In respect to a laminating method for the primer layer 12, it can be formed by a coating method, and a transfer method can be used as well. When the primer layer 12 is formed by the coating method, capable of being used are gravure coating, gravure reverse coating, gravure offset coating, spin coating, roll coating, reverse roll coating, kiss coating, wheeler coating, dip coating, solid coating by a silk screen, wire bar coating, flow coating, comma coating, overflow coating, brush coating, spray coating and the like. The transfer method is a method in which a coating film of a primer layer is once formed on a thin sheet (film base material) and then coated on the surface of the base material, and it includes a laminate method in which a coating film of a coating composition is adhered on a steric matter together with a base material and a transfer method in which a coating film and a transfer sheet having, if necessary, an adhesive layer formed thereon are adhered once on a releasable support sheet and in which only the support sheet is then peeled off.

(2) Step in which a design layer is formed on the primer layer:

Next, an ink for design is printed or coated on the primer layer 12 and then dried, if necessary, to thereby form a design layer 13. The design layer 13 comprises a picture layer and/or a whole face solid colored layer.

(3) Step in which the primer layer and the design layer are transferred on a base material:

Then, the primer layer 12 and the design layer 13 which are formed on the releasing film 11 are transferred onto a base material 14. Hot press processing using a mirror surface plate and emboss processing using a mirror surface roll are preferably used as a transfer method thereof. To be specific, the releasing film 11 on which the primer layer 12 and the design layer 13 are laminated and the base material 14 are heated and softened by means of a hot press machine and an emboss processing machine which are publicly known, and they are compressed in a superposed state and stuck together. This provides a sheet shown in FIG. 1 (a).

(4) Step in which the releasing film on the base material is peeled off:

The releasing film 11 on the base material 14 after transferred is peeled off, whereby obtained is a sheet in which the design layer 13 and the primer layer 12 are laminated in this order on the base material 14 as shown in FIG. 1 (b). In this case, a surface of the primer layer 12 is provided with a smooth surface by receiving a surface form of the releasing film in the previous step.

(5) Step in which an ionizing radiation curable resin composition is laminated on the primer layer:

Then, an ionizing radiation curable resin composition is laminated by coating a coating liquid comprising the ionizing radiation curable resin composition or a coating liquid containing the ionizing radiation curable resin composition on a smooth surface of the primer layer 12. A viscosity of the coating liquid shall not specifically be restricted as long as it is a viscosity at which an uncured resin layer can be formed on a surface of the primer layer 12 by a coating method described later.

In the production process of the present invention, the coating liquid prepared is coated on a surface of the primer layer 12 by a publicly known method such as gravure coating, bar coating, roll coating, reverse roll coating, comma coating and the like, preferably gravure coating so that a thickness thereof after cured is 1 to 30 μm, whereby an uncured resin layer is formed.

In this regard, the ionizing radiation curable resin means resins which are cross-linked and cured by irradiating with beams having an energy quantum which can cross-link and polymerize molecules among electromagnetic waves or charged particle beams, that is, a UV ray, an electron beam or the like. To be specific, products suitably selected from polymerizable monomers, polymerizable oligomers or prepolymers which have so far conventionally been used as ionizing radiation curable resins can be used.

(6) Step in which the ionizing radiation curable resin composition is cross-linked and cured to form a surface protective layer:

Next, the ionizing radiation curable resin composition is cross-linked and cured by irradiating the uncured resin layer comprising the ionizing radiation curable resin composition with an electron beam, a UV ray or the like to form a surface protective layer 15. This makes it possible to obtain a decorative sheet 10 on which the surface protective layer 15 is formed as shown in FIG. 1 (c).

In this regard, when an electron beam is used as the ionizing radiation, an accelerating voltage thereof can suitably be selected according to the resin used and a thickness of the layer, and the uncured resin layer is preferably cured usually at an accelerating voltage of 70 to 300 kV.

In radiation of the electron beam, the higher the acceleration voltage is, the more the penetrability of the electron beam is increased, and therefore when the base material 14 which is deteriorated by an electron beam is used, the accelerating voltage is selected so that a depth of penetration of the electron beam is substantially the same as a thickness of the resin layer, whereby the electron beam can be inhibited from being irradiated excessively onto the base material 14, and deterioration of the base material caused by irradiation with an excessive amount of the electron beam can be allowed to stay in a minimum level.

An irradiation dosage of the electron beam is preferably an amount in which a cross-linking density of the resin layer is saturated, and it is selected in a range of usually 5 to 300 kGy (0.5 to 30 Mrad), preferably 10 to 100 kGy (1 to 10 Mrad).

Further, the electron beam source shall not specifically be restricted, and capable of being used are various electron beam accelerators such as a Cockroft-Walton type accelerator, a Van de Graft type accelerator, a resonance transformer type accelerator, an insulating core transformer type accelerator, a linear type accelerator, a Dynamitron type accelerator, a high frequency type accelerator and the like.

When a UV ray is used as the ionizing radiation, the radiation containing a UV ray having a wavelength of 190 to 380 nm is radiated. The UV ray source shall not specifically be restricted, and used are, for example, a high pressure mercury lamp, a low pressure mercury lamp, a metal halide lamp, a carbon arc lamp and the like.

A smoothness of the surface protective layer 13 is preferably 0.01 μm or more and less than 1.0 μm, more preferably 0.01 to 0.5 μm and further preferably 0.05 to 0.2 μm in terms of an arithmetic average roughness Ra. In this regard, the arithmetic average roughness Ra means an arithmetic average roughness Ra prescribed in JIS B 0601: 2001.

(7) Roughening treatment step for a rear face of the decorative sheet:

The roughening treatment step for a rear face of the decorative sheet in the present invention shall not specifically be restricted as long as it is a step in which a rear face of the decorative sheet can be roughened to such an extent as satisfying the equation (I) and the equation (II) each described above and/or to such an extent as satisfying the arithmetic average roughness Ra described above. It includes, for example, a method in which a rear face side of the decorative sheet 10, to be specific, a face brought into no contact with the design layer 13 and the primer layer 12 on the base material 14 is roughened by hot press using a satin finished plate, emboss processing using a satin finished roll and sand blast treatment. Publicly known methods can be used for the hot press processing and the emboss processing, and a rear face of the decorative sheet 10 is roughened, as shown in FIG. 1, by softening the decorative sheet 10 by heating it at not lower than a softening temperature of the constituent base material and lower than a fusing point or a melting temperature thereof, pressurizing a rear face side of the decorative sheet 10 to provide it with a form thereof and then cooling and solidifying the decorative sheet.

Further, the roughening treatment in the present invention includes a method in which a rear face of the decorative sheet 10 is roughened, as shown in FIG. 2 (d), by providing a fine particle-containing resin layer 16.

When a rear face of the decorative sheet is roughened by hot press and emboss processing, a rear face of the decorative sheet can be roughened, to be specific, by carrying out hot press processing using a mirror plate at a surface side of the base material 14 and using a satin finished plate at a rear face side thereof and carrying out emboss processing using a mirror roll at a surface side of the base material 14 and using a satin finished roll at a rear face side thereof (refer to FIG. 1). To be more specific, when the primer layer 12 and the design layer 13 are transferred onto the base material 14, hot press processing is carried out by using a mirror plate at a releasing film 11 side and a satin finished plate at a base material 14 side, and emboss processing is carried out by using a mirror roll at a releasing film 11 side and a satin finished roll at a base material 14 side, whereby the primer layer 12 and the design layer 13 are transferred onto the base material 14, and at the same time, a rear face of the decorative sheet 10 can be roughened.

RzJIS and Ra on the surface to be treated can be controlled by controlling the hot press temperature and the emboss temperature and controlling a surface roughness of the satin finished plate and the satin finished roll. The hot press temperature and the emboss temperature may be suitably selected according to the base material, and when they are 30 to 70° C. in a case of, for example, vinyl chloride, 160 to 180° C. in a case of a polypropylene resin and 150 to 260° C. in a case of an acryl base resin, the irregular forms of the satin finished plate and the satin finished roll can be provided well. An arithmetic average roughness Ra of the satin finished plate and the satin finished roll is preferably 1.0 to 20.0 μm, more preferably 1.0 to 15.0 μm and further preferably 1.0 to 10.0 μm.

Sand blast treatment can be carried out by blowing inorganic particles of silica, titania and the like against the surface to be treated (a rear face of the decorative sheet 10) by making use of compressed air. It is carried out preferably after the step (3) described above since an arithmetic average roughness Ra on a rear face of the decorative sheet 10 is liable to be kept at a high level. RzJIS and Ra of the surface to be treated can be controlled by controlling a particle diameter of the inorganic particles and a blowing amount thereof.

A method for providing the fine particle-containing resin layer 16 on a rear face of the decorative sheet 10 includes a method in which a resin composition containing a binder resin and fine particles is laminated by the coating method and transfer method each described above (refer to FIG. 2 (d)).

When providing the fine particle-containing resin layer 16 on a rear face of the decorative sheet 10, it can be carried out before or after any step of the steps (1) to (6), and it is carried out preferably after the step (3) described above since an arithmetic average roughness Ra on a rear face of the decorative sheet 10 is liable to be kept at a high level. RzJIS and Ra of the surface to be treated can be controlled by controlling a blend ratio of the fine particles to the binder resin and a particle diameter of the fine particles.

In the roughening treatment for a rear face of the decorative sheet 10 in the present invention, an arithmetic average roughness Ra of the rear face is controlled to preferably 1.0 to 10.0 μm, more preferably 1.0 to 9.0 μm and further preferably 1.2 to 8.0 μm. In this regard, the arithmetic average roughness Ra means an arithmetic average roughness Ra prescribed in JIS B 0601: 2001.

Also, in the roughening treatment described above, a ten point average roughness Rz of the rear face is controlled to preferably 1.0 to 100.0 μm, more preferably 5.0 to 50.0 μm. In this regard, the ten point average roughness Rz means a ten point average roughness Rz prescribed in JIS B 0601: 2001.

If an arithmetic average roughness Ra on a rear face of the decorative sheet 10 is 1.0 μm or more, the effects of the present invention can be exerted. If it is 10.0 μm or less, a roughness on a rear face of the decorative sheet 10 does not exert an influence on a surface thereof, and therefore when insert molding is carried out by using, for example, the decorative sheet 10, the resulting molded article is sufficiently provided with a smoothness and a surface gloss on a surface thereof and sufficiently provided as well with an adhesive property with the injection resin.

In the roughening treatment for a rear face of the decorative sheet 10 in the present invention, a ten point average roughness RzJIS on the rear face and a thickness T of the base material satisfy preferably the following equation (I), more preferably the following equation (I-A) and particularly preferably the following equation (I-B):

$$T \times 0.30 \geq RzJIS \quad (I)$$

$$T \times 0.20 \geq RzJIS \quad (I\text{-}A)$$

$$T \times 0.18 \geq RzJIS \quad (I\text{-}B)$$

In the roughening treatment for a rear face of the decorative sheet 10 in the present invention, an arithmetic average roughness Ra on the rear face and a thickness T of the base material satisfy preferably the following equation (II), more preferably the following equation (II-A) and particularly preferably the following equation (II-B):

$$T \times 0.20 \geq Ra \geq T \times 0.005 \quad (II)$$

$$T \times 0.18 \geq Ra \geq T \times 0.02 \quad (II\text{-}A)$$

$$T \times 0.15 \geq Ra \geq T \times 0.03 \quad (II\text{-}B)$$

If an arithmetic average roughness Ra on a rear face of the decorative sheet 10 is less than the ranges described above, dents and wounds are likely to be generated on a surface thereof by wrapping therein foreign matters, and scratches and wrinkles are likely to be produced by allowing a surface and a rear face of the decorative sheet to be tightly adhered with each other. On the other hand, if an arithmetic average roughness Ra on a rear face of the decorative sheet 10 exceeds the ranges described above, an arithmetic average roughness Ra on a rear face of the decorative sheet 10 is too large as compared with a thickness of the base material, and therefore when the decorative sheet 10 is softened, a roughness on a rear face side thereof exerts an influence as well on a surface thereof to bring about the problems that a surface of the resulting molded article is inferior in a smoothness and a surface gloss when insert molding is carried out by using, for example, the decorative sheet 10 and that an adhesive property with the injection resin is inferior.

Also, if the ten point average roughness Rz exceeds, though the arithmetic average roughness Ra is small, the ranges described above, irregularities are likely to be locally generated to cause friction when the decorative sheets 10 are superposed, and scratches and the like are likely to be generated.

The releasing film 11 used in the production process of the present invention shall not specifically be restricted as long as it can be released (peeled) later even if it is brought into contact with the primer layer 12. It includes films comprising polyethylene terephthalate, polyethylene, polypropylene and the like and papers, or films and papers prepared by coating (subjected to release treatment) release agents such as silicone and the like on the above polymers. The releasing film 11 which is subjected to release treatment is liable to be peeled off and therefore is preferred.

In the production process of the present invention, the primer layer 12 formed on the releasing film 11 has the function of enhancing an adhesive property between the design layer 13 and the surface protective layer 15 which are present on the base material 14. Further, smoothing a surface of the primer layer 12 makes it possible to smooth a surface of the surface protective layer 15 without exerting an influence of the irregularities of the design layer 13 on the surface protective layer 15.

(Meth)acryl resins, urethane resins, (meth)acryl.urethane copolymer resins, vinyl chloride-vinyl acetate copolymers, polyester resins, butyral resins, chlorinated polypropylene, chlorinated polyethylene and the like are used for a primer composition constituting the primer layer 12.

Also, a thickness of the primer layer 12 is preferably 0.1 to 10 μm. A thickness of 0.1 μm or more makes it possible to exert sufficiently the effect of preventing cracking, breaking, whitening and the like on the surface protective layer. On the other hand, if a thickness of the primer layer 12 is 10 μm or less, the coating film is stably dried and cured when the primer layer is coated, and therefore the moldability is not varied. Accordingly, it is preferred.

Next, the design layer 13 comprising the picture layer and/or the whole face solid colored layer shown in FIG. 1 serves for providing the resin molded article with a decorative property. The picture layer is formed by printing various patterns with an ink by means of a printer. The patterns include woodgrain patterns, stone-grain patterns imitating the surfaces of rocks such as a marble pattern (for example, travertine marble patterns) and the like, fabric patterns imitating a blanket texture pattern and a cloth-like pattern, tiling patterns, brick work patterns and the like, and they include as well composite patterns thereof such as parquetry patterns, patchwork patterns and the like. The above patterns are formed by multi-color printing with process colors of usual yellow, red, blue and black colors, and in addition thereto, they are formed as well by multi-color printing with special colors using plates of individual colors constituting the patterns.

Materials prepared by appropriately mixing a binder with a colorant such as a pigment, a dye and the like, an extender pigment, a solvent, a stabilizer, a plasticizer, a catalyst, a curing agent and the like are used as an ink used for the design layer 13. The above binder shall not specifically be restricted, and optional ones selected from, for example, polyurethane base resins (acryl urethane copolymer resins and the like), vinyl chloride/vinyl acetate base copolymer resins, vinyl chloride/vinyl acetate/acryl resin base copolymer resins, chlorinated polypropylene base resins, acryl base resins, polyester base resins, polyamide base resins, butyral base resins, polystyrene base resins, nitrocellulose base resins, cellulose acetate base resins and the like are used alone or in a mixture of two or more kinds thereof.

Used as the colorant are inorganic pigments such as carbon black (Japanese ink), iron black, titanium white, antimony white, chrome yellow, titanium yellow, iron oxide red, cadmium red, ultramarine blue, cobalt blue and the like, organic pigments and dyes such as quinacridone red, isoindolinone yellow, phthalocyanine blue and the like, metallic pigments comprising scale-like foil pieces of aluminum, brass and the like and pearlescent (pearl) pigments comprising scale-like foil pieces of titanium dioxide-coated mica, basic lead carbonate and the like.

In the present invention, a masking layer may be provided, if necessary, between the design layer 13 and the base material 14. The masking layer is provided for the purpose of preventing an effect from being exerted on the colors of the patterns in the decorative sheet 10 by a change and a dispersion in the color of a surface of the base material 14. Usually, the masking layer is formed in an opaque color in many cases, and a so-called solid printed layer having a thickness of 1 to 20 μm is suitably used as the masking layer. A binder, a colorant and the like which are used for the masking layer are the same as those used for the design layer 13. When the design layer 13 comprises a whole face solid colored layer, it may be used as the masking layer.

The base material 14 used in the production process of the present invention is selected considering a vacuum molding aptitude and an injection molding simultaneous decoration aptitude, and to be representative, a resin sheet comprising a thermoplastic resin is used therefor. Usually used as the above thermoplastic resin are acryl resins, polyolefin base resins such as polypropylene, polyethylene and the like, polycarbonate resins, acrylonitrile-butadiene-styrene resins (hereinafter referred to as "ABS resins"), vinyl chloride resins, polyester resins and the like. Also, the base material 14 can be used in the form of a single layer sheet of the above resins or a plural layer sheet comprising the same kind or different kinds of the resins.

A thickness of the base material 14 is selected according to the uses, and it is usually 0.03 to 1.0 mm, considering a cost and the like, generally 0.03 to 0.5 mm.

A surface of the base material 14 can be subjected, if desired, to surface treatment by an oxidation method and the like in order to enhance an adhesive property thereof with the layers provided thereon.

The oxidation method described above includes, for example, corona discharge treatment, chrome oxidation treatment, flame treatment, hot blast treatment, ozone•UV ray treatment methods and the like. The above surface treatments are suitably selected according to the kind of the base materials, and usually a corona discharge treatment method is preferably used in terms of effects and an operability.

In the production process of the present invention, a polymerizable monomer and a polymerizable oligomer and/or prepolymer (hereinafter abbreviated as an oligomer/prepolymer) as the ionizing radiation curable resin used for the ionizing radiation curable resin composition shall be explained below.

To be representative, the polymerizable monomers are suitably (meth)acrylate base monomers having a radically polymerizable unsaturated group in a molecule, and among them, multifunctional (meth)acrylates are preferred. In this case, "(meth)acrylate" means "acrylate" or "methacrylate", and other similar monomers have the same meaning. The multifunctional (meth)acrylates shall not specifically be restricted as long as they are (meth)acrylates having two or more ethylenically unsaturated bonds in a molecule. To be specific, they include ethylene glycol di(meth)acrylate, propylene glycol di(meth)acrylate, 1,4-butanediol di(meth)acrylate, 1,6-hexanediol di(meth)acrylate and the like. The above multifunctional (meth)acrylates may be used alone or in combination of two or more kinds thereof.

In the present invention, monofunctional (meth)acrylates can suitably be used in combination with the multifunctional (meth)acrylates described above for the purpose of reducing a viscosity of the multifunctional (meth)acrylates as long as the effects of the present invention are not damaged. The monofunctional (meth)acrylates include, for example, methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate and the like. The above monofunctional (meth)acrylates may be used alone or in combination of two or more kinds thereof.

Next, the polymerizable oligomer/prepolymer includes oligomers/prepolymers having radically polymerizable unsaturated groups in a molecule, for example, epoxy (meth)acrylate base oligomers/prepolymers, urethane (meth)acrylate base oligomers/prepolymers, polyester (meth)acrylate base oligomers/prepolymers, polyether (meth)acrylate base oligomers/prepolymers, polycarbonate (meth)acrylate base oligomers/prepolymers and the like.

Further, the polymerizable oligomers/prepolymers include, in addition to the above compounds, polybutadiene (meth)acrylate base oligomers/prepolymers which have a (meth)acrylate group on a side chain of a polybutadiene oligomer/prepolymer and which are highly hydrophobic, silicone (meth)acrylate base oligomers/prepolymers having a polysiloxane bond on a main chain, aminoplast resin (meth) acrylate base oligomers/prepolymers obtained by modifying an aminoplast resin having a large number of reactive groups in a small molecule thereof and oligomers/prepolymers having cationically polymerizable functional groups in molecules of novolak type epoxy resins, bisphenol type epoxy resins, aliphatic vinyl ethers, aromatic vinyl ethers and the like.

If compounds containing at least polycarbonate (meth) acrylate or acryl silicone (meth)acrylate and multifunctional (meth)acrylate are used as the ionizing radiation curable resin composition in the present invention, an excellent chemical resistance, an excellent scratch resistance and a good three-dimensional moldability are satisfied at the same time, and therefore it is preferred in terms of making it possible to obtain a decorative sheet in which a surface protective layer does not suffer cracking and the like and which is liable to be three-dimensionally molded.

When a compound containing polycarbonate (meth)acrylate and multifunctional (meth)acrylate is used as the ionizing radiation curable resin composition, a weight ratio of the polycarbonate (meth)acrylate to the multifunctional (meth) acrylate is preferably 98:2 to 70:30, more preferably 95:5 to 80:20.

The polycarbonate (meth)acrylate used in the present invention shall not specifically be restricted, and it may be any one as long as it is a compound having a carbonate bond on a polymer principal chain and having (meth)acrylate on a terminal or a side chain. The above (meth)acrylate is preferably difunctional or more from the viewpoint of cross-linking and curing.

The polycarbonate (meth)acrylate has a weight average molecular weight of preferably 500 or more, more preferably 1,000 or more and further preferably exceeding 2,000 which is measured by GPC analysis and reduced to standard polystyrene. An upper limit of a weight average molecular weight of the polycarbonate (meth)acrylate shall not specifically be restricted, and it is preferably 100,000 or less, more preferably 50,000 or less from the viewpoint of controlling the viscosity so that it does not grow too high. From the viewpoint of allowing the scratch resistance to be consistent with the three-dimensional moldability, it is further preferably exceeding 2,000 and 50,000 or less, particularly preferably 5,000 to 20,000.

When a compound containing acryl silicone (meth)acrylate and multifunctional (meth)acrylate is used as the ionizing radiation curable resin composition, a weight ratio of the acryl silicone (meth)acrylate to the multifunctional (meth) acrylate is preferably 50:50 to 95:5, more preferably 95:5 to 80:20.

The acryl silicone (meth)acrylate used in the present invention shall not specifically be restricted, and it may be any one as long as it is a compound in which a part of the acryl resin is substituted with a siloxane bond (Si—O) in a molecule and which has two or more (meth)acryloyloxy groups (acryloyloxy groups or methacryloyloxy groups) as functional groups on a side chain and/or a principal chain terminal of the acryl resin.

The acryl silicone (meth)acrylate has a weight average molecular weight of preferably 1,000 or more, more preferably 2,000 or more which is measured by GPC analysis and reduced to standard polystyrene. An upper limit of a weight average molecular weight of the acryl silicone (meth)acrylate shall not specifically be restricted, and it is preferably 150,000 or less, more preferably 100,000 or less from the viewpoint of controlling the viscosity so that it does not grow too high. From the viewpoint of allowing the three-dimensional moldability to be consistent with the chemical resistance and the scratch resistance, it is particularly preferably 2,000 to 100,000.

The multifunctional (meth)acrylate used in the present invention shall not specifically be restricted as long as it is difunctional or higher (meth)acrylate. However, trifunctional or higher (meth)acrylate is preferred from the viewpoint of a curing property. In this connection, difunction means having two ethylenically unsaturated bonds ((meth)acryloyl groups) in a molecule.

Also, the multifunctional (meth)acrylate may be either of an oligomer and a monomer, but it is preferably a multifunctional (meth)acrylate oligomer from the viewpoint of enhancing the three-dimensional moldability.

The multifunctional (meth)acrylate has a weight average molecular weight of preferably 500 or more, more preferably 1,000 or more and further preferably exceeding 2,000 which is measured by GPC analysis and reduced to standard polystyrene. An upper limit of a weight average molecular weight of the multifunctional (meth)acrylate shall not specifically be restricted, and it is preferably 100,000 or less, more preferably 50,000 or less from the viewpoint of controlling the viscosity so that it does not grow too high. From the viewpoint of allowing the scratch resistance to be consistent with the three-dimensional moldability, it is further preferably exceeding 2,000 and 50,000 or less, particularly preferably 5,000 to 20,000.

The multifunctional (meth)acrylate described above includes, for example, urethane (meth)acrylate base oligomers, epoxy (meth)acrylate base oligomers, polyester (meth)acrylate base oligomers, polyether (meth)acrylate base oligomers and the like. In this connection, the urethane (meth) acrylate base oligomers can be obtained by reacting, for example, polyetherpolyol and polyesterpolyol with polyisocyanate to obtain a polyurethane oligomer and esterifying the polyurethane oligomer by (meth)acrylic acid.

Further, other multifunctional (meth)acrylates include polybutadiene (meth)acrylate base oligomers which have a (meth)acrylate group on a side chain of a polybutadiene oligomer and which are highly hydrophobic, silicone (meth) acrylate base oligomers having a polysiloxane bond on a main chain, aminoplast resin (meth)acrylate base oligomers obtained by modifying an aminoplast resin having a large number of reactive groups in a small molecule thereof and the like.

When a UV ray curable resin is used as the ionizing radiation curable resin, a photopolymerization initiator is used preferably in an amount of 0.1 to 5 parts by mass based on 100 parts by mass of the resin. The photopolymerization initiator can be selected from products which have so far been conventionally used and shall not specifically be restricted.

Also, p-dimethylbenzoic acid esters, tertiary amines, thiol base sensitizers and the like can be used as a photosensitizer.

In the present invention, an electron beam curable resin is preferably used as the ionizing radiation curable resin. The electron beam curable resin can be used in the absence of a solvent and is more preferred from the viewpoint of environmental protection and human health. Further, it does not require a photopolymerization initiator and provides a stable curing characteristic.

Other resins can be added to the ionizing radiation curable resin composition described above as long as the effects of the present invention are displayed. For example, when the decorative sheet 10 obtained by the production process of the present invention is intended to be provided with a flexibility, a thermoplastic resin can be added. On the other hand, when the durability against solvents is required, a thermoplastic resin is not preferably added.

The thermoplastic resin includes (meth)acryl base resins such as poly(meth)acrylic acid esters and the like, polyvinyl acetal (butyral resins) such as polyvinyl butyral and the like, polyester resins such as polyethylene terephthalate, polybutylene terephthalate and the like, vinyl chloride resins, urethane resins, polyolefins such as polyethylene, polypropylene and the like, styrene base resins such as polystyrene, poly-α-methylstyrene and the like, polyamides, polycarbonate, acetal resins such as polyoxymethylene and the like, fluororesins such as ethylene-ethylene tetrafluoride copolymers and the like, polyimides, polylactic acid, polyvinyl acetal resins, liquid crystalline polyester resins and the like. They may be used alone or in combination of two or more kinds thereof. When used in combination of two or more kinds thereof, they may be copolymers of monomers constituting the above resins, or the respective resins may be used in a mixture.

Among the thermoplastic resins described above, the resins comprising (meth)acryl base resins as principal components are preferred in the present invention, and among them, the resins obtained by polymerizing the monomers comprising at least (meth)acrylic esters as the monomer components are preferred.

To be more specific, preferred are homopolymers of (meth)acrylic esters, copolymers of two or more kinds of different (meth)acrylic ester monomers and copolymers of (meth)acrylic esters with other monomers.

The thermoplastic resins described above have a weight average molecular weight falling in a range of 90,000 to 120,000. If the weight average molecular weight falls in the above range, all of the moldability after cross-linking and curing to form the surface protective layer and an abrasion resistance and a scratch resistance of the surface can be obtained at high levels.

In this regard, the weight average molecular weight is a polystyrene-reduced value measured by gel permeation chromatography (GPC). A solvent used in the above case can suitably be selected from solvents usually used and includes, for example, tetrahydrofuran (THF), N-methyl-2-pyrrolidinone (NMP) and the like.

The thermoplastic resins described above have a polydispersion degree (weight average molecular weight Mw/number average molecular weight Mn) falling preferably in a range of 1.1 to 3.0. If the polydispersion degree falls in the above range, all of the moldability after cross-linking and curing to form the surface protective layer and an abrasion resistance and a scratch resistance of the surface can be obtained as well at high levels. From the viewpoint described above, a polydispersion degree of the above (meth)acryl base resins falls more preferably in a range of 1.5 to 2.5.

Additives used for the ionizing radiation curable resin composition described above include, for example, weatherability improving agents, polymerization inhibitors, cross-linking agents, IR absorbing agents, antistatic agents, adhesion improving agents, leveling agents, thixotropy providing agents, coupling agents, plasticizers, defoaming agents, fillers, solvents, colorants, abrasion resistance improving agents and the like.

Various additives can be added to the surface protective layer 15 thus formed to thereby impart various functions, for example, a so-called hard coat function providing a high hardness and an abrasion resistance, a defogging function, a stain resistant function, a glare-proof function, an antireflective function, a UV shielding function, an IR shielding function and the like.

In the present invention, a thickness of the surface protective layer 15 after cured is preferably 1 to 30 μm. If a thickness of the surface protective layer 15 after cured is 1 μm or more, the excellent design properties such as the transparence feeling, the gloss feeling and the like are obtained, and the satisfactory physical properties of the protective layer, such as a stain resistance, an abrasion resistance, a weatherability and the like are obtained. On the other hand, if it is 30 μm or less, the protective layer is prevented from being cracked and whitened in molding, and it can be endowed with a desired form and provided with a good design property after three-dimensional molding. From the above viewpoints, a thickness of the surface protective layer 15 after cured falls in a range of preferably 2 to 20 μm, more preferably 3 to 10 μm.

Capable of being used as a binder resin used for the fine particle-containing resin layer 16 are, for example, resins such as polyolefin resins including polypropylene, polyethylene and the like, polyester resins, polyurethane resins, acryl base resins, acryl urethane base resins, polycarbonate resins, vinyl chloride/vinyl acetate copolymers, polyvinyl butyral resins, nitrocellulose resins (cellulose nitrate) and the like, in addition thereto, compounds such as alkyl titanate, ethyleneimine and the like. They can suitably be selected and used from the viewpoint of an adhesive property with the adhered and the injection resin.

Capable of being used as fine particles used for the fine particle-containing resin layer 16 are, for example, inorganic fine particles of silica, talc, calcium carbonate, precipitated barium sulfate, alumina, acid clay, clay, magnesium carbonate, carbon black, tin oxide, titan white, urea powder resins and the like, acryl beads and organic fine particles comprising organic high polymers such as polyethylene, urethane resins, polycarbonate, polyamide (nylon) and the like. Among them, silica, acryl beads, polyethylene wax and the like which are readily handled and inexpensive are suited.

An average particle diameter of the fine particles is preferably 0.5 to 20 μm, more preferably 0.5 to 10 μm, and an addition amount thereof falls in a range of preferably 0.1 to 10 parts by mass, more preferably 0.5 to 5 parts by mass based on 100 parts by mass of the binder resin. A form of the particles is polyhedral, spherical, scaly and the like.

The decorative sheet 10 obtained by the production process of the present invention can be used for various injection molding methods such as an insert molding method, an injection molding simultaneous decoration method, a blow molding method, a gas injection molding method and the like, and it can be used particularly suitably for the insert molding method and the injection molding simultaneous decoration method.

In the insert molding method, the decorative sheet obtained by the production process of the present invention is subjected in advance to vacuum molding (offline preliminary molding) into a surface form of the molded article by means of a vacuum molding die in a vacuum molding step, and then surplus parts are trimmed, if necessary, to obtain a molded sheet. This molded sheet is inserted into an injection molding die, and the injection molding die is clamped. A resin staying in a flowing state is injected into the die and solidified, and the decorative sheet is integrated with an outer surface of the resin molded article at the same time as injection molding to produce a decorated resin molded article.

Resins according to the uses are used for the injection resin, and representative are polyolefin resins such as polypropylene, polyethylene and the like and thermoplastic resins such as ABS resins, styrene resins, polycarbonate resins, acryl resins, vinyl chloride resins and the like. Further, thermosetting resins such as urethane resins, epoxy resins and the like can be used as well according to the uses.

Next, in the injection molding simultaneous decoration method, the decorative sheet of the present invention is disposed in a female die used also as a vacuum molding die in which a vacuum port for injection molding is provided, and it is subjected to preliminary molding (inline preliminary molding) in the above female die. Then, the injection molding die is clamped, and a resin staying in a flowing state is injected and filled into the die and solidified, whereby the decorative sheet is integrated with an outer surface of the resin molded article at the same time as injection molding to produce a decorated resin molded article.

In the injection molding simultaneous decoration method, heat and pressure are exerted on the decorative sheet by the injection resin, and therefore the decorative sheet may be or may not be preliminarily heated when it is close to a flat board and drawn to a small extent.

Also, the same resins as explained in the insert molding method can be used as the injection resin used above.

The decorated resin molded article produced in the above manner is a molded article which is excellent in a surface smoothness and a gloss and which is provided with a high design property. Further, in the production process of the present invention, the surface protective layer is completely cured in a stage of producing the decorative sheet, and therefore a step in which the surface protective layer is cross-linked and cured after producing the decorated resin molded article is not necessary.

EXAMPLES

Next, the present invention shall be explained in further details with reference to examples, but the present invention shall by no means be restricted by these examples.

The respective evaluation methods and measuring methods shall be explained below in detail.

Arithmetic Average Roughness Ra:

Measured by means of a surface roughness measuring equipment (trade name: HANDYSURF E-35A) manufactured by Tokyo Seimitsu Co., Ltd. according to JIS B 601: 2001, wherein a roughness curve having a length L was folded back at a central line, and a value obtained by dividing a whole area surrounded by the respective roughness curves and the central line by the length L was shown by micrometer (μm).

Ten Point Average Roughness $Rz_{JIS}$:

The ten point average roughness $Rz_{JIS}$ was measured at a measuring length of 4 mm and a cutoff value of 0.8 mm according to JIS B 601:2001.

Blocking Resistance:

Two sheets of the decorative sheets were used, and a surface side of one sheet and a rear face side of the other sheet were superposed. A load of 2.94 MPa was applied thereon by means of a blocking tester, and they were left standing at 40° C. for 72 hours. Then, an adhering and sticking degree of the faces brought into contact with each other was evaluated according to the following criteria.

◯: resistance was not observed at all when the superposed decorative sheets were peeled off.

X: resistance was observed when the superposed decorative sheets were peeled off, and scratches and wrinkles originating in blocking were confirmed on the surface side of the decorative sheet.

Wounds and Dents Produced by Foreign Matters:

The decorative sheet was wound in a roll form in which a surface side of one layer and a rear face side of the other layer were superposed, and the roll was left standing at 20° C. for 168 hours. Twenty sheets of the decorative sheets were cut out of the roll to confirm the number of the sheets in which wounds and dents were observed on a surface protective layer. These wounds and dents were considered to be due to foreign matters such as fine dusts and the like which were wrapped in the roll.

◯: decorative sheets in which wounds and dents were generated were zero

Δ: decorative sheets in which wounds and dents were generated were less than 10 sheets X: decorative sheets in which wounds and dents were generated were 10 or more sheets Surface Gloss:

A gloss value was measured on the condition of an incident angle of 60° by means of a gloss meter (micro-TRI-gloss, manufactured by BYK Gardner Inc.). It is shown that the higher the numerical value is, the higher the gloss is.

Smoothness:

A surface of a molded article prepared by subjecting the decorative sheet to inset molding was visually evaluated.

◯: the surface was excellent in a smoothness, and clear images were reflected on a surface of the molded article X: the surface was short of a smoothness, and images reflected on a surface of the molded article were distorted Haze:

Evaluated by a haze value defined in ASTM D4039. The respective gloss values were measured on the condition of an incident angle of 60° and 20° by means of the gloss meter (micro-TRI-gloss, manufactured by BYK Gardner Inc.) to determine the haze values according to the following equation.

$$\text{haze value} = \text{gloss value}(60°) - \text{gloss value}(20°)$$

It is shown that the smaller the haze value is, the higher the gloss feeling and the transparence feeling are and that the larger the haze value is, the lower the hazing transparency is.

Adhesive Property with Injection Resin:

Cross-cut-shaped cuts were given on a surface of the sheet by 10 lines in a vertical direction and 10 lines in a lateral direction at an interval of 2 mm by means of a utility knife after the insert molding, and then Sellotape (trade name) manufactured by Nichiban Co., Ltd. was stuck tightly on the parts provided with the cuts and quickly peeled off.

⊚: no peeling was observed

◯: very slight peeling was observed along the cross-cut-shaped cuts

X: peeling was observed between the sheet and the injection resin

Emboss Fastness:

The decorative sheet was dipped in an oil bath of a prescribed temperature for 1 minute, and creping reversion of the emboss and a gloss thereof after dipping were visually observed. They were evaluated at every 10° C., and the highest temperature at which creping reversion was not observed and at which the gloss was not changed was shown.

Example 1

A biaxially oriented polyethylene terephthalate film (thickness: 25 μm, arithmetic average roughness (Ra): 0.01 μm) having a release layer of a silicone base on a surface layer was used as a releasing film, and an acryl/urethane block copolymer resin was coated on the above releasing film to form a transparent primer layer having a thickness of 2 μm.

Then, a design layer of a woodgrain pattern was formed on the above primer layer by gravure printing using an acryl urethane copolymer resin ink. Thereafter, a design layer side of the sheet in which the primer layer and the design layer were formed on the releasing film was brought into contact with a base material (a sheet comprising an ABS resin, thickness: 300 μm), and then the sheet was subjected to hot press processing at 150° C. under applying a pressure of 5 kgf/cm$^2$ for 10 minutes by means of a hot press machine in which a stainless-made mirror surface plate having an arithmetic average roughness Ra of 0.05 μm was used for a primer layer side (surface side) and in which a stainless-made metal plate provided with a satin finished pattern having an arithmetic average roughness Ra of 4.0 μm and a ten point average roughness RzJIS of 16 μm was used for a base material side (rear face side). After the hot press processing, the releasing film was peeled off to transfer the primer layer and the design layer onto the base material.

Next, an ionizing radiation curable resin composition comprising difunctional urethane acrylate (weight average molecular weight: 2,000) was coated on a surface of the primer layer after the releasing film was peeled off by gravure reverse so that a thickness thereof after cured was 6 μm. The above uncured resin layer was irradiated with an electron beam at an acceleration voltage of 165 kV and an irradiation dosage of 50 kGy (5 Mrad) to cure the ionizing radiation curable resin composition, whereby a decorative sheet was obtained.

The decorative sheet thus obtained had an arithmetic average roughness Ra of 0.1 μm at a surface side and 2.0 μm at a rear face side.

Next, the decorative sheet obtained was heated by means of an infrared heater until a temperature of the sheet reached 170° C. and softened, and then it was subjected to vacuum molding. The decorative sheet was released from the die, and a rear face thereof was confirmed to find that the emboss disappeared and that the sheet was flattened. Unnecessary parts of the decorative sheet subjected to vacuum molding were trimmed by pressing a die cut mold against it by applying an oil pressure. The above decorative sheet trimmed was inserted into an injection molding die, and then the die was clamped. An ABS resin was injected into the die, and the decorative sheet was laminated on a surface of the molded article and integrated therewith to obtain a decorative resin molded article by insert molding.

Example 2

A decorative sheet and a decorative resin molded article were obtained in the same manner as in Example 1, except that a stainless-made metal plate provided with a satin finished pattern having an arithmetic average roughness Ra of 8.5 μm and a ten point average roughness RzJIS of 39 μm was used for a side (rear face side) having no design layer in the hot press step.

Example 3

A decorative sheet and a decorative resin molded article were obtained in the same manner as in Example 1, except that a sheet comprising an ABS resin having a thickness of 200 μm was used for the base material and that a stainless-made metal plate provided with a satin finished pattern having an arithmetic average roughness Ra of 6.9 μm and a ten point average roughness RzJIS of 28 μm was used for aside (rear face side) having no design layer in the hot press step.

Example 4

A decorative sheet and a decorative resin molded article were obtained in the same manner as in Example 1, except that a sheet comprising an ABS resin having a thickness of 400 μm was used for the base material and that a stainless-made metal plate provided with a satin finished pattern having an arithmetic average roughness Ra of 4.0 μm and a ten point average roughness RzJIS of 23 μm was used for a side (rear face side) having no design layer in the hot press step.

Example 5

A decorative sheet and a decorative resin molded article were obtained in the same manner as in Example 1, except that a sheet comprising an ABS resin having a thickness of 400 μm was used for the base material and that used was an ionizing radiation curable resin composition obtained by mixing difunctional polycarbonate acrylate (weight average molecular weight: 10,000) and hexafunctional urethane acrylate (weight average molecular weight: 6,000) in a ratio of 94:6.

Example 6

A decorative sheet and a decorative resin molded article were obtained in the same manner as in Example 1, except that a sheet comprising an ABS resin having a thickness of 400 μm was used for the base material and that used was an ionizing radiation curable resin composition obtained by mixing difunctional acryl silicone acrylate (weight average molecular weight: 20,000) and hexafunctional urethane acrylate (weight average molecular weight: 5,000) in a ratio of 70:30.

Comparative Example 1

A decorative sheet and a decorative resin molded article were obtained in the same manner as in Example 1, except that in the hot press processing in Example 1, the hot press processing was carried out at 140° C. by using a stainless-made metal plate provided with a satin finished pattern having an arithmetic average roughness Ra of 19 μm and a ten point average roughness RzJIS of 130 μm.

Comparative Example 2

A decorative sheet and a decorative resin molded article were obtained in the same manner as in Example 1, except that a sheet comprising an ABS resin having a thickness of 200 μm was used for the base material and that in the hot press processing in Example 1, the hot press processing was carried out by using a stainless-made mirror surface plate having an arithmetic average roughness Ra of 1.8 μm and a ten point average roughness RzJIS of 6 μm for a rear face side in place of the stainless-made metal plate provided with a satin finished pattern.

Comparative Example 3

A decorative sheet and a decorative resin molded article were obtained in the same manner as in Comparative Example 1, except that in Comparative Example 2, a sheet comprising an ABS resin having a thickness of 400 μm was used for the base material and that a composition comprising 100 parts by mass of an acryl base resin and 10 parts by mass of silica (average particle diameter: 3.0 μm) was coated on a surface side in a coating amount of 1 g/m² by gravure printing to provide a fine particle-containing resin layer.

Comparative Example 4

A decorative sheet and a decorative resin molded article were obtained in the same manner as in Example 5, except that a sheet comprising an ABS resin having a thickness of 100 μm was used for the base material and that in the hot press processing in Example 1, the hot press processing was carried out by using a stainless-made mirror surface plate having an arithmetic average roughness Ra of 28.2 μm and a ten point average roughness RzJIS of 97 μm for a rear face side in place of the stainless-made metal plate provided with a satin finished pattern.

Next, an arithmetic average roughness Ra and a ten point average roughness Rz on a surface and a rear face of the decorative sheets prepared in Examples 1 to 6 and Comparative Examples 1 to 4 were measured, and an emboss fastness on a rear face thereof was measured. The results thereof are shown in Table 1 and Table 2. In addition to the above, evaluated were a blocking resistance and wounds and dents generated by foreign matters in the decorative sheets obtained in Examples 1 to 6 and Comparative Examples 1 to 4 and a surface gloss, a smoothness, a haze and an adhesive property with the injection resin in the decorative resin molded articles. The results thereof are shown in Table 1 and Table 2.

TABLE 1

|  |  |  | Example |  |  |  |  |  |
|---|---|---|---|---|---|---|---|---|
|  |  |  | 1 | 2 | 3 | 4 | 5 | 6 |
| Sheet constitution | Thickness of base material (μm) |  | 300 | 300 | 200 | 400 | 400 | 400 |
|  | Surface | Arithmetic average roughness Ra (μm) | 0.1 | 0.1 | 0.1 | 0.1 | 0.1 | 0.1 |
|  |  | Ten point average roughness Rz (μm) | 1.0 | 2.0 | 2.0 | 1.0 | 1.0 | 1.0 |
|  | Rear face | Arithmetic average roughness Ra (μm) | 2.0 | 7.0 | 5.0 | 3.0 | 2.0 | 2.0 |
|  |  | Ten point average roughness Rz (μm) | 14 | 31 | 22 | 19 | 9.0 | 11 |
| Evaluation items | Decorative sheet | Blocking resistance | ○ | ○ | ○ | ○ | ○ | ○ |
|  |  | Wounds and dents generated by foreign matters | ○ | ○ | ○ | ○ | ○ | ○ |
|  | Decorative resin molded article | Surface gloss | 88 | 84 | 84 | 88 | 90 | 91 |
|  |  | Smoothness | ○ | ○ | ○ | ○ | ○ | ○ |
|  |  | Haze | 6 | 14 | 14 | 8 | 6 | 8 |
|  |  | Adhesive property with injection resin | ○ | ○ | ○ | ○ | ○ | ○ |

TABLE 2

|  |  |  | Comparative Example |  |  |  |
|---|---|---|---|---|---|---|
|  |  |  | 1 | 2 | 3 | 4 |
| Sheet constitution | Thickness of base material (μm) |  | 300 | 200 | 400 | 100 |
|  | Surface | Arithmetic average roughness Ra (μm) | 2.5 | 0.1 | 4.0 | 0.1 |
|  |  | Ten point average Rz roughness (μm) | 15 | 0.1 | 20 | 1.0 |
|  |  | Fine particles (average particle diameter) | None | None | Silica (3.0 μm) | None |
|  | Rear face | Arithmetic average roughness Ra (μm) | 18 | 0.3 | 0.1 | 25 |
|  |  | Ten point average Rz roughness (μm) | 103 | 2 | 1 | 82 |
| Evaluation items | Decorative sheet | Blocking resistance | ○ | X | ○ | ○ |
|  |  | Wounds and dents generated by foreign matters | ○ | X | ○ | ○ |
|  | Decorative resin molded article | Surface gloss | 71 | 88 | 65 | 68 |
|  |  | Smoothness | X | ○ | X | ○ |
|  |  | Haze | 22 | 2 | 42 | 50 |
|  |  | Adhesive property with injection resin | ○ | ○ | ○ | ○ |

Example 7

A biaxially oriented polyethylene terephthalate film (thickness: 25 μm, arithmetic average roughness (Ra): 0.01 μm) having a release layer of a silicone base on a surface layer was used as a releasing film, and an acryl/urethane block copolymer resin was coated on the above releasing film to form a transparent primer layer having a thickness of 2 μm.

Then, a design layer of a woodgrain pattern was formed on the above primer layer by gravure printing using an acryl urethane copolymer resin ink. Thereafter, a design layer side of the sheet in which the primer layer and the design layer were formed on the releasing film was brought into contact with a base material (a sheet comprising an ABS resin, thickness: 400 μm), and then the sheet was subjected to hot press processing at 150° C. under applying a pressure of 5 kgf/cm² for 10 minutes by means of a hot press machine in which a stainless-made mirror surface plate having an arithmetic average roughness Ra of 0.05 μm was used for a primer layer side (surface side) and in which a stainless-made metal plate provided with a satin finished pattern having an arithmetic average roughness Ra of 8.0 μm was used for a base material side (rear face side). After the hot press processing, the releasing film was peeled off to transfer the primer layer and the design layer onto the base material.

Next, an ionizing radiation curable resin composition comprising difunctional urethane acrylate (weight average molecular weight: 2,000) was coated on a surface of the primer layer after the releasing film was peeled off by gravure reverse so that a thickness thereof after cured was 6 μm. The above uncured resin layer was irradiated with an electron beam at an acceleration voltage of 165 kV and an irradiation dosage of 50 kGy (5 Mrad) to cure the ionizing radiation curable resin composition, whereby a decorative sheet was obtained.

The decorative sheet thus obtained had an arithmetic average roughness Ra of 0.1 μm at a surface side and 3.0 μm at a rear face side. Also, it had an emboss fastness of 130° C.

Next, the decorative sheet obtained was heated by means of an infrared heater until a temperature of the sheet reached 170° C. and softened, and then it was subjected to vacuum molding. The decorative sheet was released from the die, and a rear face thereof was confirmed to find that the emboss disappeared and that the sheet was flattened. Unnecessary parts of the decorative sheet subjected to vacuum molding were trimmed by pressing a die cut mold against it by applying an oil pressure. The above decorative sheet trimmed was inserted into an injection molding die, and then the die was clamped. An ABS resin was injected into the die, and the decorative sheet was laminated on a surface of the molded article and integrated therewith to obtain a decorative resin molded article by insert molding.

Example 8

A decorative sheet and a decorative resin molded article were obtained in the same manner as in Example 7, except that a temperature of the hot press was changed to 140° C.

Example 9

A decorative sheet and a decorative resin molded article were obtained in the same manner as in Example 7, except that a temperature of the hot press was changed to 180° C.

Example 10

A decorative sheet and a decorative resin molded article were obtained in the same manner as in Example 7, except that a temperature of the hot press was changed to 230° C.

Example 11

A decorative sheet and a decorative resin molded article were obtained in the same manner as in Example 7, except that in the hot press processing in Example 7, a stainless-made mirror surface plate having an arithmetic average roughness Ra of 0.05 μm was used for a rear face side in place of the stainless-made metal plate provided with a satin finished pattern and that after curing the ionizing radiation curable resin composition on the surface, a composition comprising 100 parts by mass of an acryl base resin and 3 parts by mass of silica (average particle diameter: 1.5 μm) was coated on a rear face side in a coating amount of 1 g/m² by gravure printing to provide a fine particle-containing resin layer.

Example 12

A decorative sheet and a decorative resin molded article were obtained in the same manner as in Example 11, except that silica having an average particle diameter of 3.0 μm was used in place of silica having an average particle diameter of 1.5 μm.

Example 13

A decorative sheet and a decorative resin molded article were obtained in the same manner as in Example 11, except that silica having an average particle diameter of 5.0 μm was used in place of silica having an average particle diameter of 1.5 μm.

Example 14

A decorative sheet and a decorative resin molded article were obtained in the same manner as in Example 11, except that acryl beads having an average particle diameter of 5.0 μm were used in place of silica having an average particle diameter of 1.5 μm.

Example 15

A decorative sheet and a decorative resin molded article were obtained in the same manner as in Example 11, except that polyethylene wax having an average particle diameter of 5.0 μm was used in place of silica having an average particle diameter of 1.5 μm.

Example 16

A decorative sheet and a decorative resin molded article were obtained in the same manner as in Example 7, except that used was an ionizing radiation curable resin composition obtained by mixing difunctional polycarbonate acrylate (weight average molecular weight: 10,000) and hexafunctional urethane acrylate (weight average molecular weight: 6,000) in a ratio of 94:6.

Example 17

A decorative sheet and a decorative resin molded article were obtained in the same manner as in Example 7, except that used was an ionizing radiation curable resin composition obtained by mixing difunctional acryl silicone acrylate (weight average molecular weight: 20,000) and hexafunctional urethane acrylate (weight average molecular weight: 5,000) in a ratio of 70:30.

Comparative Example 5

A decorative sheet and a decorative resin molded article were obtained in the same manner as in Example 7, except that in the hot press processing in Example 7, the hot press processing was carried out by using a stainless-made mirror surface plate having an arithmetic average roughness Ra of 0.05 μm for a rear face side in place of the stainless-made metal plate provided with a satin finished pattern.

Comparative Example 6

A decorative sheet and a decorative resin molded article were obtained in the same manner as in Example 7, except that in the hot press processing in Example 7, the hot press processing was carried out at 140° C. by using a stainless-made metal plate provided with a satin finished pattern having an arithmetic average roughness Ra of 19 μm for a rear face side.

Comparative Example 7

A decorative sheet and a decorative resin molded article were obtained in the same manner as in Comparative Example 5, except that in Comparative Example 5, a composition comprising 100 parts by mass of an acryl base resin and 10 parts by mass of silica (average particle diameter: 3.0 μm) was coated on a surface side in a coating amount of 1 g/m² by gravure printing to provide a fine particle-containing resin layer.

Comparative Example 8

A decorative sheet and a decorative resin molded article were obtained in the same manner as in Example 11, except that silica having an average particle diameter of 0.1 μm was used in place of silica having an average particle diameter of 1.5 μm.

Comparative Example 9

A decorative sheet and a decorative resin molded article were obtained in the same manner as in Example 11, except that silica having an average particle diameter of 9.0 μm was used in place of silica having an average particle diameter of 1.5 μm.

Comparative Example 10

A decorative sheet and a decorative resin molded article were obtained in the same manner as in Comparative Example 5, except that in Comparative Example 5, an isopropyl alcohol 10% solution of a cationic surfactant (trimethylammonium dimethylsulfate) as an antistatic agent was coated on a rear face side by gravure coating so that a coating thickness thereof in drying was 0.5 g/m³.

An arithmetic average roughness Ra and a ten point average roughness Rz on a surface and a rear face of the decorative sheets prepared in Examples 7 to 17 and Comparative Examples 5 to 10 were measured, and an emboss fastness on a rear face thereof was measured. The results thereof are shown in Table 3 to Table 5. In addition to the above, evaluated were a blocking resistance and wounds and dents generated by foreign matters in the decorative sheets obtained in Examples 7 to 17 and Comparative Examples 5 to 10 and a surface gloss, a smoothness, a haze and an adhesive property with the injection resin in the decorative resin molded articles. The results thereof are shown in Table 3 to Table 5.

TABLE 3

| | | | Example | | | | | | | | |
|---|---|---|---|---|---|---|---|---|---|---|---|
| | | | 7 | 8 | 9 | 10 | 11 | 12 | 13 | 14 | 15 |
| Sheet constitution | Surface | Arithmetic average roughness Ra (μm) | 0.1 | 0.1 | 0.1 | 0.1 | 0.1 | 0.1 | 0.1 | 0.1 | 0.1 |
| | | Ten point average roughness Rz (μm) | 1 | 1 | 1 | 1 | 1 | 1 | 1 | 1 | 1 |
| | | Fine particle | None | None | None | None | None | None | None | None | None |
| | Rear face | Arithmetic average roughness Ra (μm) | 3 | 1.5 | 5 | 7 | 1 | 4 | 6 | 7 | 6 |
| | | Ten point average roughness Rz (μm) | 13 | 10 | 27 | 35 | — | — | — | — | — |
| | | Emboss fastness (° C.) | 130° C. | 120° C. | 140° C. | 200° C. | — | — | — | — | — |
| | | Fine particle (average particle diameter) | None | None | None | None | Silica (1.5 μm) | Silica (3.0 μm) | Silica (5.0 μm) | Acryl beads (5.0 μm) | Polyethylene wax (5.0 μm) |
| Evaluation items | Decorative sheet | Blocking resistance | ○ | ○ | ○ | ○ | ○ | ○ | ○ | ○ | ○ |
| | | Wounds and dents generated by foreign matters | ○ | ○ | ○ | ○ | ○ | ○ | ○ | ○ | ○ |
| | Decorative resin molded article | Surface gloss | 90 | 91 | 88 | 85 | 89 | 87 | 90 | 89 | 89 |
| | | Smoothness | ○ | ○ | ○ | ○ | ○ | ○ | ○ | ○ | ○ |
| | | Haze | 5.9 | 5.7 | 6.1 | 6.9 | 5.7 | 5.8 | 6.0 | 6.2 | 7.3 |
| | | Adhesive property with injection resin | ◎ | ◎ | ◎ | ○ | ○ | ○ | ○ | ○ | ○ |

TABLE 4

| | | | Example | |
|---|---|---|---|---|
| | | | 16 | 17 |
| Sheet constitution | Surface | Arithmetic average roughness Ra (μm) | 0.1 | 0.1 |
| | | Ten point average roughness Rz (μm) | 1 | 1 |
| | | Fine particles (average particle diameter) | None | None |

TABLE 4-continued

|  |  |  | Example | |
|---|---|---|---|---|
|  |  |  | 16 | 17 |
|  | Rear face | Arithmetic average roughness Ra (μm) | 2 | 1.5 |
|  |  | Ten point average roughness Rz (μm) | 12 | 11 |
|  |  | Emboss fastness (° C.) | 130° C. | 130° C. |
|  |  | Fine particles (average particle diameter) | None | None |
| Evaluation items | Decorative sheet | Blocking resistance | ○ | ○ |
|  |  | Wounds and dents generated by foreign matters | ○ | ○ |
|  | Decorated resin molded article | Surface gloss | 90 | 91 |
|  |  | Smoothness | ○ | ○ |
|  |  | Haze | 5.7 | 4.9 |
|  |  | Adhesive property with injection resin | ◎ | ◎ |

TABLE 5

|  |  |  | Comparative Example | | | | | |
|---|---|---|---|---|---|---|---|---|
|  |  |  | 5 | 6 | 7 | 8 | 9 | 10 |
| Sheet constitution | Surface | Arithmetic average roughness Ra (μm) | 0.1 | 2.3 | 4 | 0.1 | 0.1 | 0.1 |
|  |  | Ten point average roughness Rz (μm) | 1 | 15 | 20 | 1 | 1 | 1 |
|  |  | Fine particles (average particle diameter) | None | None | Silica (3.0 μm) | None | None | None |
|  | Rear face | Arithmetic average roughness Ra (μm) | 0.1 | 13 | 0.1 | 0.2 | 13 | 0.1 |
|  |  | Ten point average roughness Rz (μm) | 1 | 60 | 1 | — | — | — |
|  |  | Emboss fastness (° C.) | — | 140° C. | — | — | — | — |
|  |  | Fine particles (average particle diameter) | None | None | None | Silica (0.1 μm) | Silica (9.0 μm) | None |
|  |  | Surfactant | None | None | None | None | None | Present |
| Evaluation items | Decorative sheet | Blocking resistance | X | ○ | ○ | X | ○ | ○ |
|  |  | Wounds and dents generated by foreign matters | X | ○ | ○ | X | Δ | Δ |
|  | Decorative resin molded article | Surface gloss | 92 | 80 | 65 | 88 | 85 | 89 |
|  |  | Smoothness | ○ | X | X | ○ | ○ | ○ |
|  |  | Haze | 5.9 | 30 | 42 | 6.2 | 9.5 | 6.0 |
|  |  | Adhesive property with injection resin | ○ | ○ | ○ | ○ | X | X |

As shown in Table 1 and Table 2, the decorative sheets prepared in Examples 1 to 6 did not generate blocking and dents and wounds by wrapping therein foreign matters even when winding them on a roll. In contrast with this, in Comparative Example 1 in which T×0.30<RzJIS was shown, a smoothness on a surface of the decorated resin molded article was damaged. On the other hand, in Comparative Example 2 in which Ra<T×0.005 was shown, blocking and dents and wounds by wrapping therein foreign matters were generated.

Also, in Comparative Example 3 in which the fine particle-containing resin layer was provided on a surface side of the decorative sheet, a smoothness on a surface of the decorative resin molded article was damaged.

In Comparative Example 4, Ra and RzJIS were too large, and therefore a gloss on a surface of the decorative resin molded article was notably reduced to generate a haze.

Also, as shown in Table 3 to Table 5, the decorative sheets prepared in Examples 7 to 17 did not generate blocking and dents and wounds by wrapping therein foreign matters even when winding them on a roll. In contrast with this, in Comparative Examples 5 and 9 in which an arithmetic average roughness Ra on the rear face was less than 1.0 μm, blocking and dents and wounds by wrapping therein foreign matters were generated. On the other hand, in Comparative Examples 6 and 9 in which an arithmetic average roughness Ra on the rear face exceeded 10.0 μm, brought about were the problems that a smoothness on a surface of the decorative sheet was damaged and that the adhesive property with the injection resin was reduced.

Also, in Comparative Example 7 in which the fine particle-containing resin layer was provided on a surface side of the decorative sheet, a smoothness on a surface of the decorative sheet was damaged.

In Comparative Example 10, blocking was inhibited by coating the surfactant on a rear face side of the decorative sheet, but since both surfaces of the decorative sheet were smooth, dents and wounds caused by wrapping therein foreign matters could not completely be prevented, and the adhesive property with the injection resin was reduced.

Industrial Applicability

The decorative sheets obtained by the production process of the present invention are suitably used for decorative resin molded articles including, for example, interior materials or exterior materials of vehicles and the like, fixture members such as skirting boards, cornices and the like, fittings such as window frames, door frames and the like, interior materials for buildings such as walls, floors, ceilings and the like, housings and vessels for home electric appliances such as TV receivers, air conditioners and the like.

What is claimed is:

1. A production process for a decorative sheet comprising a step in which a primer layer is formed on a releasing film having a smooth surface, a step in which a design layer is formed on the above primer layer, a step in which the primer layer and the design layer are transferred on a base material, a step in which the releasing film on the base material is peeled off, a step in which an ionizing radiation curable resin composition is laminated on the primer layer formed on the base material and a step in which the above ionizing radiation curable resin composition is cross-linked and cured to form a surface protective layer, wherein it further comprises a roughening treatment step in which a ten point average roughness RzJIS on a rear face of the decorative sheet and a thickness T of the base material are controlled to satisfy the following equation (I) and in which an arithmetic average roughness Ra on the rear face and a thickness T of the base material are controlled to satisfy the following equation (II):

$$T \times 0.30 \geq Rz\text{JIS} \quad \text{(I)}$$

$$T \times 0.20 \geq Ra \geq T \times 0.005 \quad \text{(II)}.$$

2. A production process for a decorative sheet comprising a step in which a primer layer is formed on a releasing film having a smooth surface, a step in which a design layer is formed on the above primer layer, a step in which the primer layer and the design layer are transferred on a base material, a step in which the releasing film on the base material is peeled off, a step in which an ionizing radiation curable resin composition is laminated on the primer layer formed on the base material and a step in which the above ionizing radiation curable resin composition is cross-linked and cured to form a surface protective layer, wherein it further comprises a roughening treatment step in which an arithmetic average roughness Ra on a rear face of the decorative sheet is controlled to 1.0 to 10.0 μm.

3. The production process for a decorative sheet according to claim 2, wherein the roughening treatment is carried out by subjecting the base material to hot press processing using a satin finished plate and emboss processing hot press using a satin finished roll.

4. The production process for a decorative sheet according to claim 2, wherein the roughening treatment is carried out by providing a resin layer containing fine particles on a rear face side of the base material.

5. The production process for a decorative sheet according to claim 1, wherein the roughening treatment is carried out by subjecting the base material to hot press processing using a satin finished plate and emboss processing hot press using a satin finished roll.

6. The production process for a decorative sheet according to claim 1, wherein the roughening treatment is carried out by providing a resin layer containing fine particles on a rear face side of the base material.

* * * * *